United States Patent [19]

Shaw

[11] 4,181,474
[45] Jan. 1, 1980

[54] VERTICAL AXIS HERMETIC ROTARY HELICAL SCREW COMPRESSOR WITH IMPROVED ROTARY BEARINGS AND OIL MANAGEMENT

[75] Inventor: David N. Shaw, Unionville, Conn.

[73] Assignee: Dunham-Bush, Inc., West Hartford, Conn.

[21] Appl. No.: 882,728

[22] Filed: Mar. 2, 1978

[51] Int. Cl.² .......................... F01C 1/16; F01C 21/06
[52] U.S. Cl. ................................. 417/366; 417/372; 417/902; 418/97; 418/99; 418/201
[58] Field of Search ............... 417/366, 369, 372, 902; 418/97, 99, 201

[56] References Cited

U.S. PATENT DOCUMENTS

| | | | |
|---|---|---|---|
| Re. 29,283 | 6/1977 | Shaw | 418/201 X |
| 3,432,089 | 3/1969 | Schibbye | 418/201 X |
| 3,796,526 | 3/1974 | Cawley | 418/201 X |
| 3,922,114 | 11/1975 | Hamilton | 417/372 X |
| 4,005,949 | 2/1977 | Grant | 418/201 X |

FOREIGN PATENT DOCUMENTS

635613  3/1962  Italy ........................................ 418/201

*Primary Examiner*—Carlton R. Croyle
*Assistant Examiner*—R. E. Gluck
*Attorney, Agent, or Firm*—Sughrue, Rothwell, Mion, Zinn and Macpeak

[57] ABSTRACT

In a vertical hermetic compressor, an inner cylindrical housing coaxially mounted within a sealed outer enclosure, sealably carries at its lower end, paired helical screw rotors defining with the inner housing a screw compressor compression chamber and supports coaxially with one of the screw rotors and constituting an axial extension thereof the compressor electrical drive motor by longitudinally spaced tapered roller bearings. Oil is bled from the sump and fed to the suction inlet tube to the compressor upstream of the working gas filter. Compressed working fluid is discharged axially downwardly with the lower tapered roller bearing assembly providing a minimal high pressure gap between the screw rotor ends and the stationary end plates. Entrained oil from the discharge passage which extends through the electric motor rotor seeks the suction side of the compressor through the upper of the two tapered roller bearing pack assemblies for controlled continuous lubrication of the upper bearing assembly. The compressed working fluid discharges axially through the center of the sealed outer enclosure at its upper end free of oil which is separated by impact with a curved plate deflector overlying the upper end of the electric motor and by centrifugal force provided by the electric motor rotor rotation. The upper bearing pack assembly for the screw rotors may employ needle bearings instead of tapered roller bearings and the lower bearing pack assemblies may incorporate radially extending needle bearings for thrust take up in lieu of one set of tapered roller bearings, with the needle bearings carried by a spherical, self-aligning mounting assembly. A capillary line passing through the compressor inlet passage carries oil from the sump to an injection port opening to a closed thread just after suction cut off for lubricating and sealing of the screw rotors.

21 Claims, 13 Drawing Figures

VERTICAL AXIS HERMETIC ROTARY HELICAL SCREW COMPRESSOR WITH IMPROVED ROTARY BEARINGS AND OIL MANAGEMENT

BACKGROUND OF THE INVENTION

1. Field of the Invention

This invention relates to hermetic, vertical axis rotary helical screw compressors, and more particularly, to such hermetic compressors as disclosed in U.S. Pat. No. 3,922,114 issued Nov. 25, 1975, and assigned to the common assignee.

2. Description of the Prior Art

Hermetic, vertical axis, rotary helical screw compressors have evolved, particularly in low horsepower size, as unitary pieces of equipment including within the hermetic housing, means for separating and cooling the oil which is necessary for lubrication of the moving parts and for forming compression chambers or closed threads between the intermeshed helical screw rotors and the surrounding compressor housing. Further, by incorporating within such vertical axis hermetic rotary helical screw compressor packages, the electrical drive motor which is open to the compressor discharge, the motor windings may be readily cooled, that is, maintained at a relatively low operating temperature by the discharge gas as it moves vertically upward from the compressor which underlies the electric drive motor, prior to discharge of the compressed gas at the upper end of the hermetic outer enclosure.

In the hermetic, rotary helical screw compressor of U.S. Pat. No. 3,922,114, the outer, generally cylindrical and sealed enclosure supports internally a two part inner cylindrical housing which forms with the outer enclosure a sealed chamber, while the inner housing itself forms a high pressure or discharge side second chamber, housing the electric drive motor and a third low pressure or inlet gas chamber sealed from the first and second chambers and within which is incorporated the helical screw rotors defining the compression chambers. In that hermetic compressor design, the helical screw rotors and the compressor drive motor rotor are supported for rotation about their axes by sleeve bearings or the like. An oil pump fixed to one of the compressor helical screw rotor shafts and being driven thereby acts to pressurize the oil accumulating within the bottom of the outer container which acts as a sump for the oil. Such oil under high pressure is conducted through passages within the screw rotor shafts for lubricating the sleeve bearings and the intermeshed helical screw rotors. Further, in that compressor design, the suction side of the screw compressor unit is at the lower end of the vertical assembly, the high pressure gas discharges vertically upwards, at the upper end of the meshed helical screw rotors and is directed through suitable passages to the second chamber, housing the electric motor. Necessarily, due to the reaction forces developed during compression of the gas, balance pistons connected to the rotors require applied oil pressure on the side opposite the discharge gas to balance the developed thrust forces. In order to separate the oil entrained in the discharge gas by way of the compression process and employed for lubricating the bearings and for sealing the intermeshed rotary helical screw rotors, the hermetic design of U.S. Pat. No. 3,922,114 includes an incorporated oil separation scheme. Axial passages are provided within the electric motor rotor to effect centrifugal oil separation and through the electric motor stator for draining separated oil and radial, preferably canted, discharge passages extend through the hermetic inner casing upper chamber wall into the first chamber defined by the outer enclosure for tangential impingement of the separated oil on the outer enclosure wall.

While the vertical, hermetic rotary screw compressor of that design operates satisfactorily, the structural make up is fairly complicated, expensive to manufacture and requires overthrust compensation for the developed axial thrust forces to insure minimum gap dimension between the helical screw rotors on the discharge side of the compressor and fixed end plates defining the second and third chambers which house the electric drive motor and the helical screw rotors respectively.

It is therefore an object of the present invention to provide an improved, vertical axis, rotary helical screw compressor of the hermetic type which eliminates the necessity for balance pistons and the necessity for an oil pump without compromising the wear life of the rotary bearings of the hermetic compressor.

It is a further objection of the present invention to provide an improved vertical, hermetic rotary helical screw compressor in which some oil introduced to the compressor working fluid is distributed to the compressor and drive motor bearings during normal passage of compressor discharge gas to the discharge outlet of the hermetic unit.

It is a further object of the present invention to provide an improved vertical, hermetic rotary helical screw compressor in which oil separation is achieved in a simplified manner without the need of internal and external sealed housings.

SUMMARY OF THE INVENTION

The vertical axis hermetic rotary helical screw compressor constituted by a closed vertical cylindrical outer enclosure and an inner cylindrical casing supports vertically a shaft which coaxially mounts a helical screw rotor intermediate of its ends for rotation about the vertical shaft axis by upper and lower roller bearing pack assemblies, the upper roller bearing pack assembly being mounted to the transverse wall of the inner casing and the lower roller bearing pack assembly being mounted to an end plate. An electrical drive motor is mounted above the screw rotor and has its rotor coaxially mounted to the upper end of the vertical shaft above the upper roller bearing pack assembly. The compressor inlet tube opens through the inner casing to the helical screw rotor at its upper end with the compressed working fluid discharging at the lower end of the helical screw rotors. Passages within the casing permit the discharge gas to pass upwardly about the shaft and through the motor to act axially on the motor shaft and the rotary seal element carried by the upper roller bearing pack assembly for partially balancing the thrust forces generated during compression of the working fluid. Entrained oil passes to the tapered roller bearing pack assembly and across the seal seeking the low pressure, suction side of the compressor. Multiple roller bearings are applied within each pack assembly and the lower tapered roller bearing pack assembly includes multiple shims for fixedly mounting the shaft and its rotor spaced slightly from the casing end plate to minimize compressed working fluid leakage in the area of the compressor discharge passage and end plate. The bearing pack assemblies may utilize wholly or partially, needle roller bearings in lieu of tapered roller bearings. Also, the pack assemblies may comprise a single roller bearing. A capillary line passing through the compressor inlet and being looped therein to form a heat exchanger for cooling of the oil carried thereby and projecting from the oil sump, permits cooled oil to be injected through an injection port open to a closed thread just after suction cut off to lubricate and seal the screw rotors.

DESCRIPTION OF THE PREFERRED EMBODIMENTS

Figure 1:
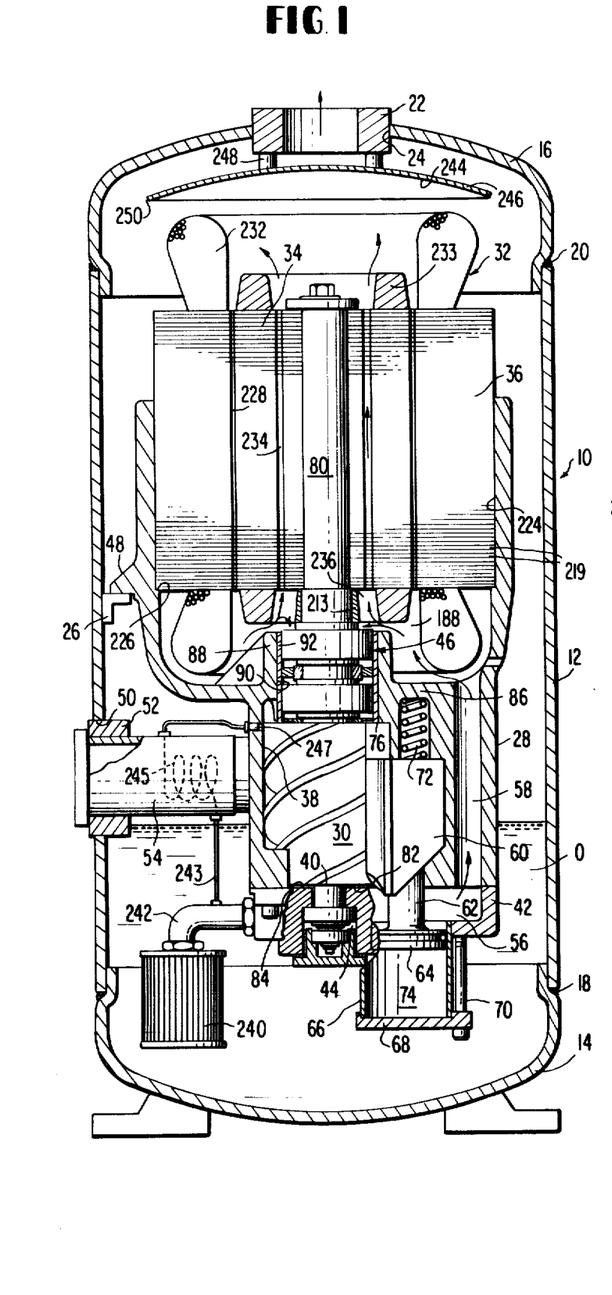
FIG. 1 is a sectional, elevational view of one embodiment of the improved vertical, hermetic rotary helical screw compressor of the present invention.

Referring to FIGS. 1-4 inclusive and FIG. 7, there is shown one embodiment of the present invention in which FIG. 1 constitutes a vertical sectional view thereof. The vertical axis, hermetic helical screw compressor or unit is comprised of a generally cylindrical outer, metal enclosure indicated generally at 10 which consists of a central cylinder 12, a lower or bottom end wall 14, and a cover or upper end cap wall 16. The lower end wall 14 is welded at 18 to the lower end of cylinder 12, while in similar fashion the upper end wall or cover 16 is welded as at 20 to the upper end of cylinder 12, completing a sealed outer enclosure. The hermetic unit discharges through an enclosure outlet defined by an annular boss 22, fitting within a vertical, central opening 24 within the cover or upper end cap wall 16. The cylinder 12 carries internally, a number of circumferentially spaced L-shaped brackets 26 which are welded or otherwise affixed to the inner surface of cylinder 12 at a median vertical position which act as mounts for a unitary, inner casing or housing 28 which is generally of cylindrical form and which acts as the compressor housing for the helical screw rotors such as female rotor 30, FIG. 1, and also for the electric drive motor which is indicated generally at 32. Motor 32 constitutes a rotor 34 and stator 36. Casing 28 is provided with parallel rotor bores such as bore 38 being open at its bottom end 40. The bottom end of the casing 28 is closed off by an outlet housing or casing end plate indicated generally at 42. The casing 28 and end plate 42 act to support for each rotor, a lower outlet, or discharge tapered roller bearing pack assembly, such as assembly 44, for helical screw female rotor 30. Assembly 44 constitutes, along with upper or inlet or suction tapered roller bearing pack assembly 46 for screw rotor 30, the means for rotatably supporting this screw rotor, and in addition, similar bearing pack assemblies (not shown) are provided for the male rotor (not shown). Casing 28 is provided with integral feet 48 at circumferentially spaced positions corresponding to brackets 26 such that the casing 28 is supported on the brackets, the feet being fixed to the brackets by means (not shown). The outer enclosure cylinder 12 is further provided with an opening 50 carrying an annular boss 52 which in turn threadably or otherwise sealably supports a compressor inlet or suction tube or pipe 54. Tube 54 extends from the cylinder 12 to the wall of casing 28, tube 54 opening to the outside of the hermetic unit to the left, FIG. 1, and opening to the interior of bore 38 within the casing 28 at a point where the helical screw rotors are intermeshed; at the top of the intermeshed screws and defining the suction or inlet side of the compressor. By way of end plate 42, there is formed at the lower end of casing 28 a compressor discharge passage 56 which acts in conjunction with vertical passage 58 within casing 28 to cause the compressed working fluid of the compressor to be directed upwardly towards the compressor drive motor 32.

In typical helical screw rotary compressor fashion, the casing 28 bears a longitudinally slidable, capacity control slide valve member 60 which is fixed to a shaft 62 terminating in piston 64. Piston 64 is housed within the slide valve drive motor cylinder 66 which is closed off at its lower end by cover 68, the cover 68 being mounted to the end wall 42 by way of suitable screws 70. The piston 64 and the slide valve 60 are spring biased by means of coil spring 72 so as to seek a fully closed position, while the application of fluid pressure to chamber 74 defined by the piston 64, cylinder 66 and end plate 68, causes the piston to move upwardly against the bias of the spring, permitting the slide valve, which performs a capacity control function, to move into a position where its upper end abuts a shoulder 76 of casing 28 for maximum compression.

The shift in the slide valve 60 effects a variation in the amount of gas which is returned to the suction side of the machine prior to compression, thus varying the capacity of the compressor. The slide valve also controls the radial discharge port of the compressor. The operation of the slide valve is standard and does not form a part of the present invention.

The present invention is particularly concerned with the nature of the simplified support of the helical screw rotors such as rotor 30 and the take up of the radial and axial forces acting on the rotors, their support shafts and the drive motor rotor 34, in the case of the helical screw rotor 30 since it is mounted to shaft 80, common with the helical screw rotor 30. Instead of the utilization of sleeve bearings for take up of radial forces and thrust surfaces and balance pistons for take up of the thrust forces, the present invention employs the lower and upper tapered roller bearing pack assemblies to perform this function under a simplified manufacturing technique. Further, the helical screw rotors may be set precisely in terms of their position relative to the end face of the fixed compressor casing components. In FIG. 1, minimization of the axial gap between the high pressure end face 82 of female screw rotor 30 and the opposing face 84 of end plate 42 occurs to limit loss of the high pressure discharge gas which tends to seek the low pressure or suction side of the machine at and after compressor discharge by way of slide valve 60 and discharge passage 56. Casing 28 incorporates a horizontal or transverse, integral end wall 86 on the suction side of the compressor and intermediate of the helical screw rotors and the electric drive motor 32. End wall 86 is provided with right angle, central, cylindrical section 88, defining a cylindrical wall or bore 90 which receives the thin metal sleeve 92 of suction tapered roller bearing pack assembly 46. Longitudinally spaced pairs of double row tapered roller bearings form the principal components of the upper bearing pack assembly 46.

Figure 2:
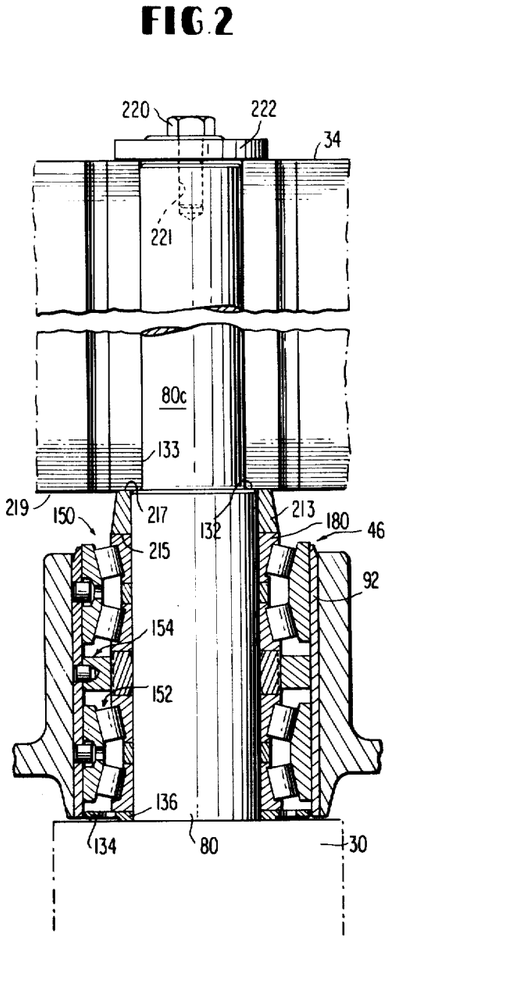
FIG. 2 is an enlarged, sectional view of the electric drive motor and suction tapered roller bearing assembly portion of the compressor of FIG. 1.
Figure 3:
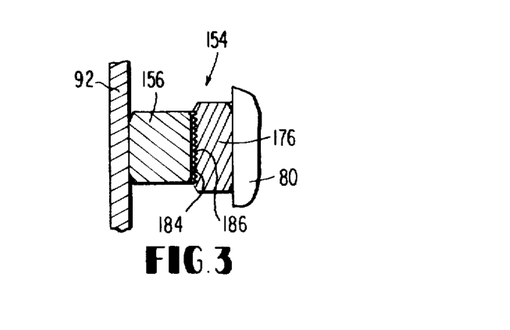
FIG. 3 is an enlarged, sectional view of a portion of the bearing assembly of FIG. 2 showing the labyrinth seal which is carried between the double row tapered roller bearings.
Figure 4:
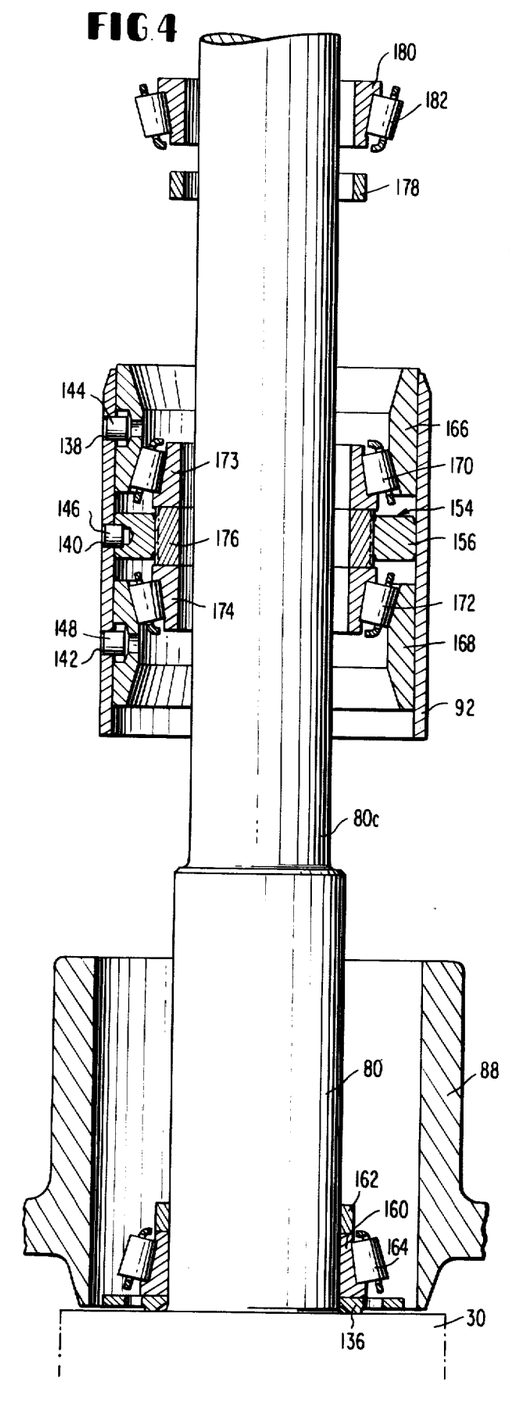
FIG. 4 is a vertical, exploded sectional view of the portion of the compressor shown in FIG. 2, exemplary showing the sequence of operation in assembling the suction bearing assembly to the female rotor shaft and compressor housing.

The nature and make up of the assembly and the incorporated labyrinth seal for sealing the row of tapered roller bearings of that assembly from the lower row which are open to the suction side of the compressor, may be seen by further reference to FIGS. 2, 3 and 4. Further, the nature, make up and assembly and mounting of the discharge or lower tapered roller bearing pack assembly 44 may be seen by additional reference to FIGS. 7A-7D.

Figure 7A:
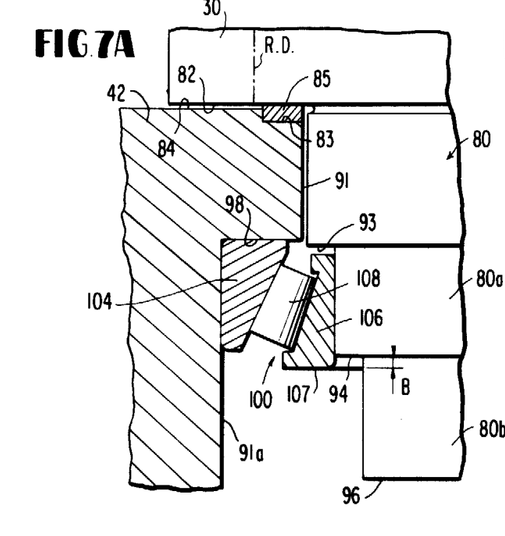
FIGS. 7A-7D are enlarged, sectional views of a portion of the hermetic compressor of FIG. 1 showing the sequence in assembly of the discharge tapered roller bearing pack assembly.
Figure 7B:
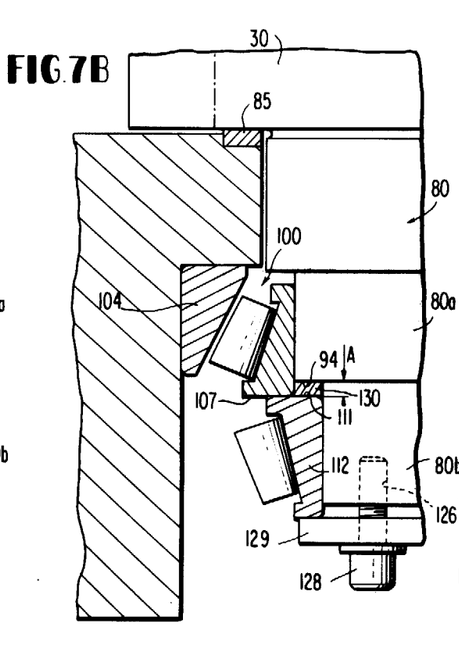
Figure 7C:
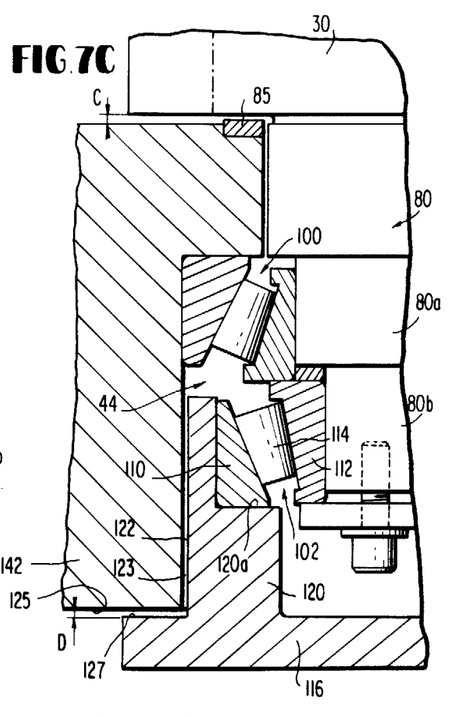

Due to the weight of the screw rotors for both rotor shafts and the drive motor rotor 30 of shaft 80, it is preferred that end plate 42 be provided with a suitable thrust bearing which bears, when the rotors are at rest, on the end face of the rotor. As illustrated in FIGS. 7A-7C, in this embodiment of the invention, the end plate 42 is provided with an annular recess 83 adjacent bore 91 which bears an annular ring 85 of a low friction, long life, self-lubricating bearing material such as DU (a registered trademark of the Glacier Metal Company, Ltd.). In this respect, DU is a composite material consisting of a steel backing strip having a 0.010 inch thick sintered porous bond surface layer into which is impregnated a homogeneous polytetrafluoroethylene-lead mixture with a thin overlay of polytetrafluoroethylene and lead up to 0.001 inch thickness. The internal diameter of the bearing ring 85 is slightly larger than that of shaft 80, while the outside diameter approximates the root diameter RD of the rotor 30 carrier by shaft 80. The thickness of the bearing ring 85 is greater than the depth of the recess 83 receiving the same, so that at rest the end face 82 of rotor 30 is spaced slightly from the thrust surface 84 of end plate 42. Alternatively, the ring 85 may be replaced by anti-friction bearings such as ball bearings or the like.

End plate 42 is provided with an opening of relatively small diameter as at 91 within face 84 which underlies the end face 82 of the female screw rotor 30 carried by shaft 80. The end plate 42 opening 91 is enlarged at 91a to a diameter for positioning of the components of the lower tapered roller bearing pack assembly 44 which rotatably supports shaft 80 at the lower end of the casing 28. In that respect, shaft 80 is provided, at its lower end, with a first reduced diameter portion 80a forming a first shoulder 93, a second reduced diameter portion 80b forming a second shoulder 94 and terminates in an end face 96. Shoulder 93 is in general radial alignment with shoulder 98 at the enlarged diameter opening portion 91a of end plate 42. The lower tapered roller bearing pack assembly 44 comprises two single tapered roller bearings: a first tapered roller bearing indicated generally at 100 and mounted to the shaft 80 at shaft reduced diameter portion 80a, and a second tapered roller bearing indicated generally at 102 carried on the shaft 80 at shaft reduced diameter portion 80b. Bearing 100 comprises a radially outer cup 104 of annular form and of trapezoidal cross-section, and a radially inner, annular cone 106 of trapezoidal cross-section. Interposed between the cup 104 and cone 106 are a plurality of circumferentially spaced tapered rollers 108. The bearings 100 and 102 are conventional and may constitute for instance SKF tapered roller bearings under trade designation TSS or TSSF, for instance. In similar fashion, the single row tapered roller bearing 102 comprises a radially outer, annular cup 110 and a radially inner, annular cone 112, with tapered rollers 114 interposed between each of these trapezoidal cross-section members and defining a circumferential or full annular array. The assembly pack is completed by means of a lower bearing pack assembly end plate 116 which spans across the opening 91 and its enlargement 91a, with the end plate 116 having a diameter in excess thereof and permitting by way of threaded screws 118 the fixing of the lower bearing pack assembly end plate 116 to compressor end plate 42. An annular cup retainer 120 which is generally L-shaped in cross-section is integral with end plate 116 and is of a diameter such that its radially outer periphery 122 is spaced from wall 91a so as to define a radial gap 123 between these members. An annular shim 124 having a thickness D which is determined on the basis of the desired axial gap between rotor outlet end face 84 and end plate 42, both when the compressor is at rest and when it is in operation, and interposed between the outer face of end plate 42 and the end plate 116, acts to axially position the end plate relative to the outlet end face 82 of the helical screw rotor 30 in FIG. 7D, to insure under all conditions a gap of dimension "C" therebetween.

Further, shaft 80 is provided with a tapped and threaded bore as at 126 which receives a threaded screw 128 which fixedly, mechanically, locks cone 112 to the shaft 80 by driving that cone axially towards shoulder 94 by pressure exerted on cone retainer plate 129. In addition to shim 124, the present invention particularly employs a second shim constituting an annular member or ring 130 which has an internal diameter on the order of shaft portion 80b and an external diameter which is slightly less than the diameter of shaft portion 80a. The thickness of the shim 130 is particularly important to the obtaining of the necessary clearance or gap C between the face 84 of the end plate 42 and the outlet end face 82 of the helical screw rotor 30.

The sequence of operation in the mounting of the shaft 80 at its lower end, suitably supported for rotation, by the lower tapered roller bearing pack assembly 44, for illustrated female helical screw rotor 30 (the same technique and structure being applied to the male rotor), is shown in FIGS. 7A-7D inclusive. Turning to FIG. 7A, it is noted that only the elements of the tapered roller bearing 100 are shown. In this case, the cup 104 is positioned within the larger diameter portion 91a of casing end plate 42 such that the cup 104 abuts shoulder 98 of that member. With the rollers 108 in place, the cone 106 is pressed onto shaft portion 80a, with the rotor end face 82 flush against the DU bearing ring 85 of the end plate 42, achieved by gravity force acting on shaft 80, electric motor rotor 34 and screw rotor 30. Applied force may also be required to be exerted on the upper end of shaft 80 or on the components fixed thereto to maintain the gap dimension between end faces 82 and 84 as set by ring 85 during this assembly step. When the end face of cup 104 is pressed against shoulder 98, measurement B is taken of the distance between the lower end face 107 of cone 106 and shoulder 94. The thickness A of shim 130 is then the desired measurement B at zero gap between the outlet end face 82 of the female helical screw rotor 30 and bearing ring 85 of the end plate 42, plus the desired thickness of gap C between the rotor 30 and end plate 42.

Assuming that the measurement B equals 0.015 inches and the desired thickness of gap C is 0.003 inches, then the thickness of the shim 130 permitting this relationship becomes 0.018 inches. It should be remembered that minimal gap dimension is required between the outlet end face 84 of screw rotors for both female and male screws and the end face 84 of casing 42, and the same technique applies to that screw rotor.

Referring next to FIG. 7B, the second step in the operation is locking of bearing 100, and particularly cone 106, to shaft sections 80a and cone 112 of bearing 102 to shaft section 80b in positions which will subsequently maintain the desired clearance C between faces 82 and 84 of the rotor 30 and end plate 42 respectively. In that regard, with the shim 130 in place, cone 112 is force fitted to shaft portion 80b such that the upper end face 111 of cone 112 presses against the lower end face 107 of cone 106 and shim 130 which abuts shoulder 94. This assembly is maintained in place by the cone retainer plate 129 which is locked to the outer end face 132 of cone 112 by screw 128.

Figure 7D:
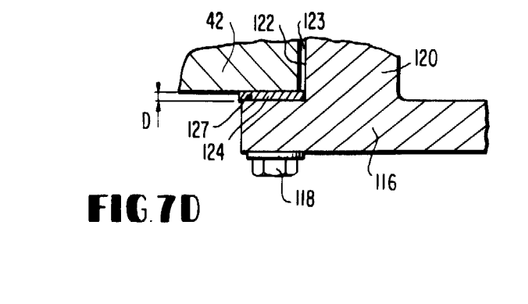

Finally, a measurement is made for the thickness of the shim 124. The lower bearing pack assembly end plate 116 has provided on annular cup retainer 120 inner periphery, a large internal diameter portion 121, forming a shoulder 120d upon which rests the lower end of cup 110 of bearing 102. With cup 110 so positioned, and by placing the tapered rollers 114 in an annular array between the cup 110 and cone 112, and by pressing plate 116 and its integral cup retainer 120 axially into the large diameter opening portion 90a of end plate 42, shaft 80 is shifted axially upwardly until bearings 108 seat against cup 104, and cup 110 against bearings 114. At this point, the desired clearance gap C exists between rotor end face 82 and surface 84 of the end plate 42. Further, there exists a gap D between the outer end face 125 of end plate 42 and the inner surface 127 of lower bearing pack assembly end plate 116. The thickness of this gap D determines the thickness of shim 124 which is of a diameter in excess of the outer diameter 122 of the annular cup retainer 120 and is interposed between the end plate 42 and surface 127 of lower bearing pack assembly end plate 116. The end plate 42 is tapped and threaded to receive screws 118 which permits, as shown in FIG. 7D, the fixing of the lower bearing pack assembly end plate 116 and its integral cup retainer 120 to end plate 42, thereby supporting shaft 80, female helical screw rotor 30 and the drive motor rotor 34 in proper position, such that, regardless of developed forces during compression of the working fluid, a constant, narrow clearance or gap C is maintained on the discharge or outlet side of the compressor preventing loss of compressed working fluid to the inlet side of the compressor from this point.

It should be noted that by the utilization of the tapered roller bearings, the bearings can function both to take up axial and radial loads. In the instant case, the cup 104 of the single row tapered roller bearing 100 performs the function of carrying the radial load, while cup 110 of the single row tapered roller bearing 102 carries no radial load whatsoever. Cup 110 in this case is functioning to absorb the reverse thrust load at compressor start up, that is, an axial loading rather than radial loading. Since the cup 110 is not functioning to carry any radial loading, there is deliberately provided a radial gap 123 between the outside diameter of the bearing cup retainer 120 and the the outlet end plate 42 opening 91a.

As noted previously, the thickness of shim 130 is such that gap C is maintained as small as possible, for instance 0.003" to minimize the escape of the high pressure compressed gas at the high pressure or discharge side of the machine.

The thickness D of shim 124 may be readily determined by utilization of a feeler between end plate face 84 and outlet end face 82 of the female screw rotor and will maintain this desired gap dimension when the bearing cup retainer 120 axially presses the cone 112 against shim 130 and, in turn, cup 104 against shoulder 98, thus locating rotor 30 spaced with respect to the end plate 42.

Referring to FIGS. 1, 2, 3 and 4, the nature of the assembly and make up of the inlet or suction bearing pack assembly 46 for screw rotor 30 and shaft 80 may be seen. In this case again, only shaft 80 is illustrated. Male rotor (not shown) utilizes a similar inlet bearing pack assembly. Shaft 80 is integral with or has fixed thereto, the helical screw rotor 30, and is driven by the rotor 34 of the drive motor which is fixed to the upper end of that shaft. Shaft 80 is provided above rotor 30 with a reduced diameter portion 80c forming a shoulder 132 upon which the lowermost laminae of rotor 30 abuts, the rotor laminae being hollow as at 133 to permit the rotor to receive portion 80c of shaft 80. Prior thereto, the inlet bearing pack assembly 46 is mounted on the shaft 80 intermediate of the reduced diameter portion 80c and rotor 30. The low pressure suction or inlet end face 134 of the female helical screw rotor 30 faces upwardly. In immediate contact with the inlet end face 134 of rotor 30 on shaft 80 is an annular spacer 136 having an inside diameter slightly larger than shaft 80 and an outside diameter which is slightly less than the metal sleeve 92 of the outlet bearing pack assembly 46.

Sleeve 92 of the inlet bearing pack assembly 46 may be formed of seamless steel and is provided with three axially spaced sets of circumferentially spaced drilled holes, the holes being at 138, 140 and 142 for respective sets. Holes 138, 140 and 142 support retaining pins which may be hollow metal tubes as at 144, 146 and 148. The upper bearing pack assembly 46 consists essentially of two double row, tapered roller bearings, generally at 150 and 152, respectively, separated by a labyrinth seal indicated generally at 154. The double row tapered roller bearing 150 is maintained axially within and properly positioned relative sleeve 92 by pins 144, the labyrinth seal outer ring 156 by pins 146 and double row tapered roller bearing 152 by pins 148. While only one pin is illustrated as maintaining the outer races or cups of the tapered roller bearings and the outer element of the labyrinth seal mounted to the sleeve 92, in fact a plurality of such pins are employed circumferentially spaced, for instance at 120°, with respect to each other and about the periphery of sleeve 92.

With annular spacer 136 in place, in the sequence, FIG. 4, the lower cone 160 being of annular form and trapezoidal in cross-section and having an internal diameter slightly less than the diameter of a main shaft portion 80 is pressed or heat shrunk axially onto that shaft and in contact with the female rotor end face spacer 136. Next, a metal ring or intermediate spacer 162 is concentrically applied to the shaft and forced axially into position so as to abut the upper end of cone 160. A series of bearing rollers 164 are provided to cone 160 and constitute an annular array in contact with cone 160.

It is at this point that the major components of the upper and lower double row tapered roller bearings 150 and 152 are forcibly mounted to the main portion of shaft 80, while the sleeve 92 is press fitted into cylinder 88. The subassembly which is pressed into that position constitutes, as seen in FIG. 4, not only sleeve 92, but outer race 166 for the upper double tapered row roller bearing 150, labyrinth ring 156, outer race 168 of the lower double row tapered roller bearings 152; these elements being suitably coupled to sleeve 92 and remaining axially fixed by way of the series of pins 144, 146 and 148 for respective members. Due to the oppositely tapered surfaces at the ends of the outer races 166, 168, not only are the rollers 170 for the upper double row tapered roller bearing 150 and 172 for the lower double row tapered roller bearing 152, maintained in position, but since these rollers bear on their respective annular cones 173 and 174 separated by a labyrinth seal spacer 176, all of these elements are maintained in proper radial and axial positions. At the same time, the sleeve 92 is press fitted to the inner surface of cylinder 88 and cones 173 and 174 and the inner space 176 of the labyrinth seal are press fitted to the central portion of shaft 80. Members 173, 174 and 176 have an inner diameter somewhat less than the diameter of the central portion of shaft 80.

Subsequently, the assembly is completed by axially press fitting spacer 178 of rectangular cross-section onto the main portion of shaft 80, and in abutting contact with the upper end of cone 173 and force fitting annular cone 180 of double row tapered roller bearing 150 onto the main portion of shaft 80 such that the rollers 182 contact the axially tapered face of the outer race 166 of that bearing. The rollers 182 constitute a circumferential or annular array interposed between outer race 166 and cone 180. In effecting the assembly of these elements for both the inlet tapered roller bearing pack assembly 46 and the outlet tapered roller bearing pack assembly 44, the elements may be appropriately shrunk fit to the portions of the shaft receiving the same or to sleeve 92 of casing end plate 42 or forcibly press fitted by axially applied pressure in accordance with conventional assembly techniques.

Reference to FIG. 3 illustrates in greater detail the make up of the labyrinth seal 154 for the upper, inlet tapered roller bearing pack assembly 46. In that respect, the labyrinth ring 156 and the labyrinth spacer 176 are both annular elements of generally rectangular cross-sectional configuration. The radial inner face 184 of the ring 156 is smooth, while the opposite radially outward face 186 of the spacer is serrated with circumferential grooves forming a longitudinal array and defining a very small and finite air gap between members 156 and 176. As may be seen in FIG. 1, the discharge gas from the compressor as controlled by the slide valve 60 in passing upwardly through passage 58 to the opposite side of transverse inlet end wall 86 and in entering a chamber or casing portion 188 within casing 28 causes the upper double row tapered roller bearing 150 to be subjected to discharge pressure. This discharge pressure tends to seek the suction side of tapered roller bearing pack assembly 46, but is prevented from directly reaching the inlet end face 134 of the female rotor 30 by the labyrinth seal 154. A major pressure drop exists across the gap defined by the serrated face 186 and the smooth face 184 of the seal members 176 and 156 respectively. The lower double row tapered roller bearing 152, is close to the suction pressure of the compressor, while the upper tapered roller bearing 150 is essentially at compressor discharge pressure. This pressure differential results in migration of oil through the inlet bearing pack assembly 46 towards the suction side of the compressor.

Figure 5:
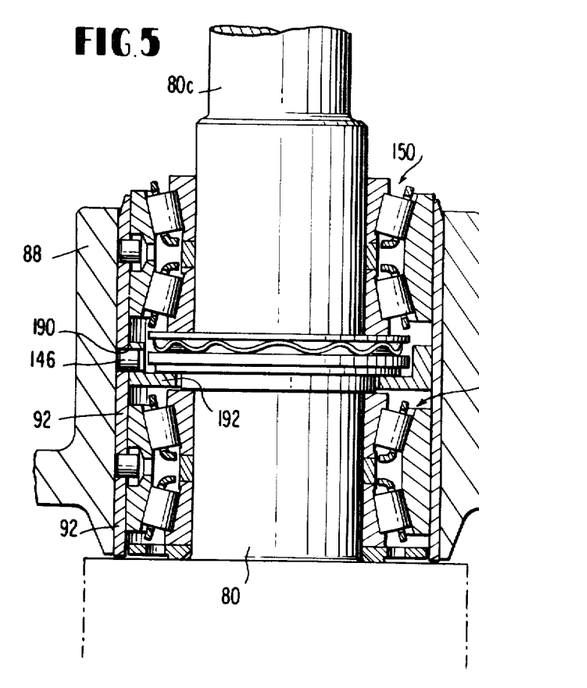
FIG. 5 is a vertical sectional view of a modified suction tapered roller bearing assembly for use in a second embodiment of the hermetic screw compressor of the present invention.
Figure 6:
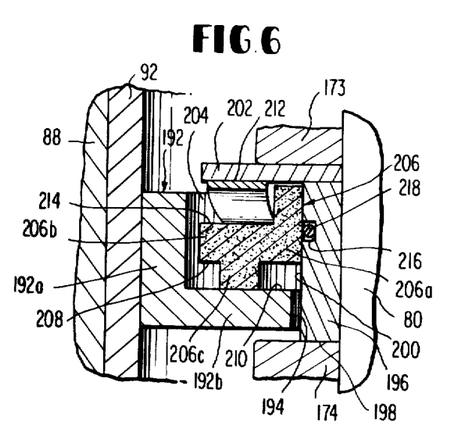
FIG. 6 is an enlarged, sectional view of the face seal employed within the upper tapered roller bearing assembly of FIG. 5.

FIGS. 5 and 6 show an alternate embodiment of the invention incorporating a slightly different seal intermediate of the upper and lower double row tapered roller bearings 150 and 152. In the case of the embodiment of FIGS. 5 and 6, like elements are given like numerical designations to that of the embodiment shown in FIGS. 1–4 inclusive. In this embodiment, the series of pins 146 within sleeve 92 project within openings 190 of an L-shaped, fixed, annular face element or member 192. It being L-shaped in longitudinal section, includes a base portion 192a abutting sleeve 92 and a projecting leg portion 192b which extends radially towards the shaft 80. The fixed seal element 192 has an outer diameter on the order of the inner diameter of the sleeve 92, so as to be sealably in contact with that member. Leg portion 192b has an inner diameter defining annular end wall 194, which is spaced radially from a rotating annulus or seal ring 196 which is press fitted to or heat shrunk onto shaft 80 with one end 198 in contact with cone 174 of the lower of the two double rows tapered roller bearings. The annulus 196 is of rectangular cross-section including a radially outer face 200 which faces the fixed seal element 192. A thin, spring retainer ring 202 having an inner diameter slightly less than shaft 80 and having an outer diameter in excess of the annulus 196 is sandwiched between the upper end of the rotating annulus or ring 196 and cone 173 of bearing 150. The spring retainer ring 202 has an outer diameter which is somewhat less than the inner diameter of base 192a of the fixed seal element 192. Mounted within a cavity or chamber 204 defined by the rotating annulus 196, the fixed seal element 192 and the spring retainer ring 202, is a carbon seal element 206 in the form of a complete annulus or ring but being of irregular configuration. The configuration of carbon face seal element 206 is of modified L-shape, in longitudinal section, including a base portion 206a in contact with the radially outer periphery 200 of the rotating annulus or seal ring 196. The L-shaped carbon face seal element 206 further includes a radially outwardly directed portion 206b which extends towards but terminates short of the base portion 192a of the fixed seal element 192. Further, an axial projection 206c extends from one axial wall 208 towards and abuts with the facing surface 210 of the fixed seal element 192. These members are maintained in contact during rotation of the shaft by means of an annular, wavy spring 212 which is interposed within cavity 204 and which abuts axially the spring retaining ring 202 and a radial face or surface 214 of the portion 206b of the carbon face seal element. Preferably, ring 196 on face 200 is provided with an annular groove 216 within which is carried an O-ring 218 to assist in sealing the upper bearing 150 which is at discharge pressure from bearing 152 at near suction pressure.

In the face seal arrangement, the wavy spring 212 is compressed between the carbon seal element 206 and the spring retaining ring 202, to cause projection 206a to be frictionally pressed against the radial leg 190b of the fixed seal element. The fixed seal element, of course, remains fixed while the spring retainer ring 202, the wavy spring 212, the rotating ring 196 and the carbon face seal element 206 rotate with the shaft 80. Since the carbon face seal element 206 is not fixed to either the rotating annulus or ring 196 or the fixed seal element 192, and since the spring force is axial or longitudinal, the O-ring tends to maintain a seal at this point so as to prevent axial passage of the high pressure discharge gas between the upper tapered roller bearing 150 and lower tapered roller bearing 152 of tapered roller bearing pack assembly 46.

With either the tapered roller bearing pack assembly 46 of the embodiment of FIG. 2 or 46' of the embodiment of FIGS. 5 and 6, mounted as shown in FIGS. 2 and 5, the assembly may be completed by placing the motor rotor 34 consisting of a series of laminated metal sheets 210 as a stacked array on the upper, reduced diameter portion 80c of shaft 80. In that respect, a tapered ring 213 is mounted to the bearing pack assembly 46, abutting the upper cup 180 on its lower end face 215 and having its upper end face 217 abutting the lowermost laminate sheet 219 of rotor 34. The upper end of the shaft portion 80c bears a tapped and threaded axial hole 221 which receives the threaded end of a screw 220 which passes through and has its head abutting a circular shaft end plate 222. The end plate 222 presses against the rotor which in turn presses the elements axially bearing pack assemblies 46 or 46' against the unitary female helical screw rotor 30.

With the rotor 34 mounted to the shaft 80, stator 36 may be positioned fixedly on casing 28 at its upper end above the horizontal end wall 86, or alternatively the stator 36 may be predisposed prior to disposition of shaft 80 on the same casing by way of the lower and upper bearing pack assemblies 44 and 46, respectively. Casing 28 is enlarged at its upper end and is internally relieved as at 224 to form a small shoulder 226 for locating the laminate sheets 219 of stator 36. Stator 36 carries windings 232. The windings 232 surround windings 233 carried by rotor 34, the stator and rotor being separated by an annular gap 228 which may act as an annular passage for the discharge gas which is caused to move upwardly particularly by the rotation of rotor 34 since the rotor is provided with a plurality of axially extending, circumferentially spaced, passages 234 within the rotor laminations. The rotor acts as a centrifugal pump with the discharge gas moving in the direction of arrows, FIG. 1, into chamber 188 housing the rotor and stator, flowing about the lower end of the stator windings 232 and between those windings and the cylinder 18. It then enters an annular cavity 236 between annular spacer 213 and the rotor windings 233. Since the gas must take several turns and since the lower end of the bearing pack assembly 46 is subjected to suction or inlet pressure, there is a tendency for some of the oil entrained in the discharge gas to migrate into the tapered roller bearing 150 and to lubricate this bearing. Further, with the pressure on the lower side of the labyrinth seal 154 being less than that on the upper side, oil passes along with the small volume flow of discharge gas between labyrinth seal members 156 and 176 to further lubricate tapered roller bearing 152.

The oil indicated by the letter O, FIG. 1, fills the hermetic casing or housing to approximately the level of the inlet or suction tube 54, FIG. 1. In this embodiment, oil is cleaned by passing through strainer 240. The oil being at the discharge pressure of the compressor, thus tends to move by pressure differential through passages (not shown) internally of casing 28, seeking compressor suction pressure. Those passages connect to tube or pipe 242 leading from the strainer 30 to end plate 42, FIG. 1. In the present invention, in the multiple embodiments, the shafts for both the female and male rotors may be hollowed or otherwise provided with passages leading to the various bearings and components of the hermetic unit which require oil lubrication. Alternatively, the fixed housing or casing 28 may incorporate oil passages to insure suitable lubrication to the moving elements within the hermetic unit. Since oil is conventionally provided to the helical screw rotor such as rotor 30, the working fluid, such as a freon refrigerant or the like, in entering as a vapor through inlet or suction tube 54 to the compression chamber as partially defined by bore 38, will entrain the oil which is used for lubrication and sealing purposes and will carry this oil in the gas discharge stream as evidenced by the arrows, FIG. 1.

As mentioned previously, a portion of this oil will be lost to the bearing pack assemblies, since the upper bearing pack assembly 46 for instance has its lower end open to the suction side of the compressor, below the horizontal end plate 86, and in an area in close proximity to compressor inlet as defined by the juncture of tube 54 and casing 28. The majority of the oil as entrained within the discharge gas is carried through the axially extending passages 234 within rotor 34, parallel to the axis of shaft 80. This discharge gas is swirled as a result of high speed rotation of the motor rotor 34, oil tends to be separated from the discharge gas by centrifugal force action at the upper end of the motor 36, while at the same time, due to the axial movement of the gas flow, a portion of the entrained oil strikes the lower surface 244 of metal sheet deflector 246 which is mounted to fitting or boss 22 by means of rods 248. The deflector 246 is of disc shape and is concave downwardly, such that the accumulated oil tends to flow to the peripheral edge 250 of deflector 246 and falls down and over the stator and accumulates within the bottom of the outer casing 10 such that the outer casing 10 acts as a sump for the oil. The deflector 246 is spaced only slightly in an axial direction with respect to the windings 232 to maximize the separation of oil by impact and attachment to the lower surface 244 of that member, while at the same time, this properly correlates the flow of the oil free gas which passes about the peripheral edge 250 of the deflector and between the deflector 246 and cover 16 for exiting in the direction of the arrow shown.

Further, and most importantly, in addition to the discharge gas tending to effect oil separation by centrifugal force due to passage through the bores 243 within rotor 34, the discharge gas tends to act axially on the upper end of shaft 80 towards gap C between the outlet end face 82 of the female rotor 30 and surface 84 of the fixed end plate 42. The same effect occurs with respect to the male rotor and its shaft (not shown).

Thus, in this type of arrangement, rather than requiring the utilization of a separate balance piston to which hydraulic pressure such as oil under pressure from a separate oil pump as in the referred to patent, the present invention utilizes to a maximum, the cross-sectional area of the shaft 80 at its upper end, and the maximum effective diameter of that shaft by way of the labyrinth seal annular spacer 176, the upper axial end face of that member also being subjected to discharge pressure to partially balance out developed thrust forces during compression. The major portion of the developed thrust which acts during compression to force the screws upwardly, is balanced out by the discharge gas acting on the upper end of shaft 80 and on the upper face of annular spacer 176 of the labyrinth seal 154, in the embodiment of FIG. 1 and the spring retainer ring 202 of the FIG. 6 embodiment. Further, in the present arrangement, the rotor 34 which has some mass has its weight acting in opposition to the developed thrust adding to the counterbalance forces by the discharge gas acting on shaft 80 and on its rotating elements. This permits in the instant case the utilization of the tapered roller bearings to take up both radial and axial forces, it being sufficient that dual tapered roller bearings are provided for the inlet tapered roller bearing pack assembly 46 and outlet tapered roller bearing pack assembly 44.

Further, as shown in FIG. 1, preferably a small capillary tube 243 is coupled to the oil supply pipe 242 downstream of strainer 240, whereby a small portion of the filtered oil may be directed through the capillary tube 243 to a looped portion or coil 245 within the compressor suction or inlet 54, where the oil is cooled by the refrigerant vapor returning to the compressor which is approximately 40° F. The capillary tube 243 terminates at compressor casing 28 and opens to an oil injection port 247, which, in turn, opens to a closed thread just after rotor suction cut off from inlet 54. Thus, the high viscosity of the oil increases the sealing action of the oil, and the low temperature reduces the evolution of refrigerant from the oil flow itself, thus contributing substantially to an increase in volumetric efficiency of the compressor without a subsequent increase in the power required for the motor driving that compressor. Effectively, the oil may be cooled down from approximately 160° which is the temperature in the sump to 100° F. by means of the 40° F. suction gas to the compressor.

Figure 8:
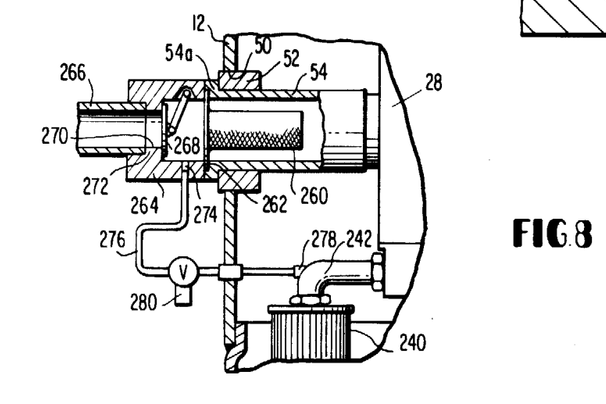
FIG. 8 is an enlarged vertical section of a portion of the compressor of the present invention, as a second embodiment utilizing the suction filter to filter compressor oil.

Turning to FIG. 8, an alternate form of the invention incorporates in a simple and expedient manner an arrangement for effectively filtering the oil to remove micron size contaminants by utilization of the filter assembly associated with the compressor suction or inlet tube 54. As in the prior embodiments, like elements are given like numerical designations. Thus, the compressor outer casing cylinder 12 is provided with an opening 50 mounting an annular boss 52 through which protrudes the inlet or suction pipe or tube 54, the inner end of which is coupled to casing 28 and open to the helical screw rotors. Further, the hermetic compressor unit is provided with an oil strainer 240 which connects by way of pipe or tube 242 to casing 28 and specifically by way of the end plate 42 to deliver oil to flow passages (not shown) through the rotor and/or stator casing portions of the screw compressor for lubricating the bearings within this alternative embodiment and for sealing of the hermetic screw rotors (not shown).

This embodiment employs a fine mesh filter sleeve as at 260 which is mounted by way of an annular ring 262 to the leading end of the inlet tube 54, being sandwiched between a flanged portion 54a of that element and a cylindrical valve casing 264 which is fixed to and constitutes an axial extension of the inlet tube 54 external of casing cylinder 12. A conduit 266 which feeds working fluid such as freon refrigerant in vapor form to the compressor, is mounted to valve casing 264 and the valve casing carries internally a pivotable check valve 268 which closes off an opening 270 within the vertical wall 272 of valve casing 264 which is aligned with conduit 266. The filter element 260 is therefore downstream of the check valve to selectively permit vapor to enter the compressor but prevents reverse flow. Valve casing 264 is provided with a radial passage 274 within the sidewall of that member, within which is mounted one end of an oil bleed tube 276, the opposite end projecting through the cylinder wall 12 of the compressor hermetic casing or housing and terminates at fitting 278, opening to the interior of tube 242 feeding oil to the compressor casing 28.

Within line 276, is the solenoid operated valve 280 which is selectively energized by appropriate controls to permit upon start up of the compressor, the bleeding by way of pressure differential of a portion of the oil being circulated through the system as picked up by oil strainer 240, this oil entering into the intake or suction gas stream upstream of filter 260 and thus being filtered by this element. Particles of a size 4 mm will be filtered out from the oil, thus permitting the oil circulating through the system to be continuously cleaned by the same means which effectively cleans the gas as it returns to the suction side of the compressor.

Figure 9:
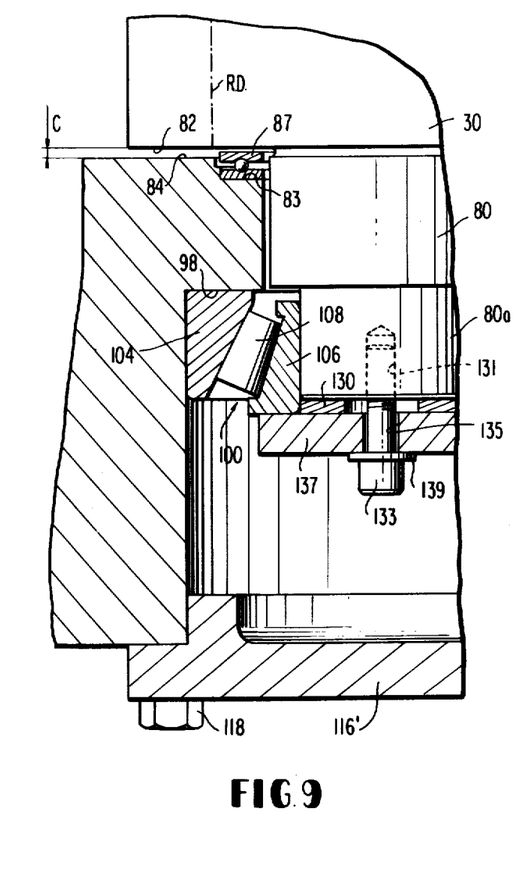
FIG. 9 is an enlarged vertical sectional view of a portion of the discharge end of one of the screw rotors in a modified form of the invention.

In an alternate embodiment of the invention, the lower bearing pack assembly is modified to some extent as may be seen in FIG. 9, wherein in this embodiment elements common to the embodiment of FIGS. 7A–7D inclusive bear like numerals. The end plate 42 is provided with a recess 83 within its thrust surface 84 identical to that of the earlier embodiment, but instead of receiving a bearing ring formed of DU, it receives a ball bearing assembly 87 being appropriately sized to that of the DU bearing ring and maintaining a predetermined minimal clearance between the thrust surface or end face 84 of the end plate 42 and outlet end face 82 of rotor 30 and occupying a surface area from shaft 80 to the root diameter RD of rotor 30. Instead of two rows of tapered roller bearings, a single tapered roller bearing 100 is provided consisting of cup 104, cone 106 and rollers 108. The cup 104 abuts shoulder 98 of the end plate 42 and the cone 106 bears on the surface of shaft portion 80a. An annular shim or ring 130 determines the axial position of cone 106 and provides for the desired clearance C between the opposed end face 84 of end plate 42 and end face 82 of rotor 30. In a simplified manner, the shaft terminates with a reduced diameter section 80a, this shaft portion bearing a tapped and threaded bore 131 which receives the threaded end of a screw 133 which projects through a hole 135 within a bearing assembly thrust plate 137. A washer as at 139 may be interposed between the head of the screw 133 and the plate 137. The lower bearing pack assembly end plate 116' is simply mounted to end plate 42 by suitable screws 118. However, in this case, it does not bear directly or indirectly on either the cone 106 or cup 104 of the tapered roller bearing 100. The screw 133 may be torqued to preload the roller bearing 100 by a given value, say approximately 50 pounds. This may be particularly appropriate where the casing portions as for instance end plate 42 are formed of a light weight metal such as aluminum while the rotors are formed of stainless steel, thus exhibiting differing thermal expansion and contraction characteristics.

Figure 10:
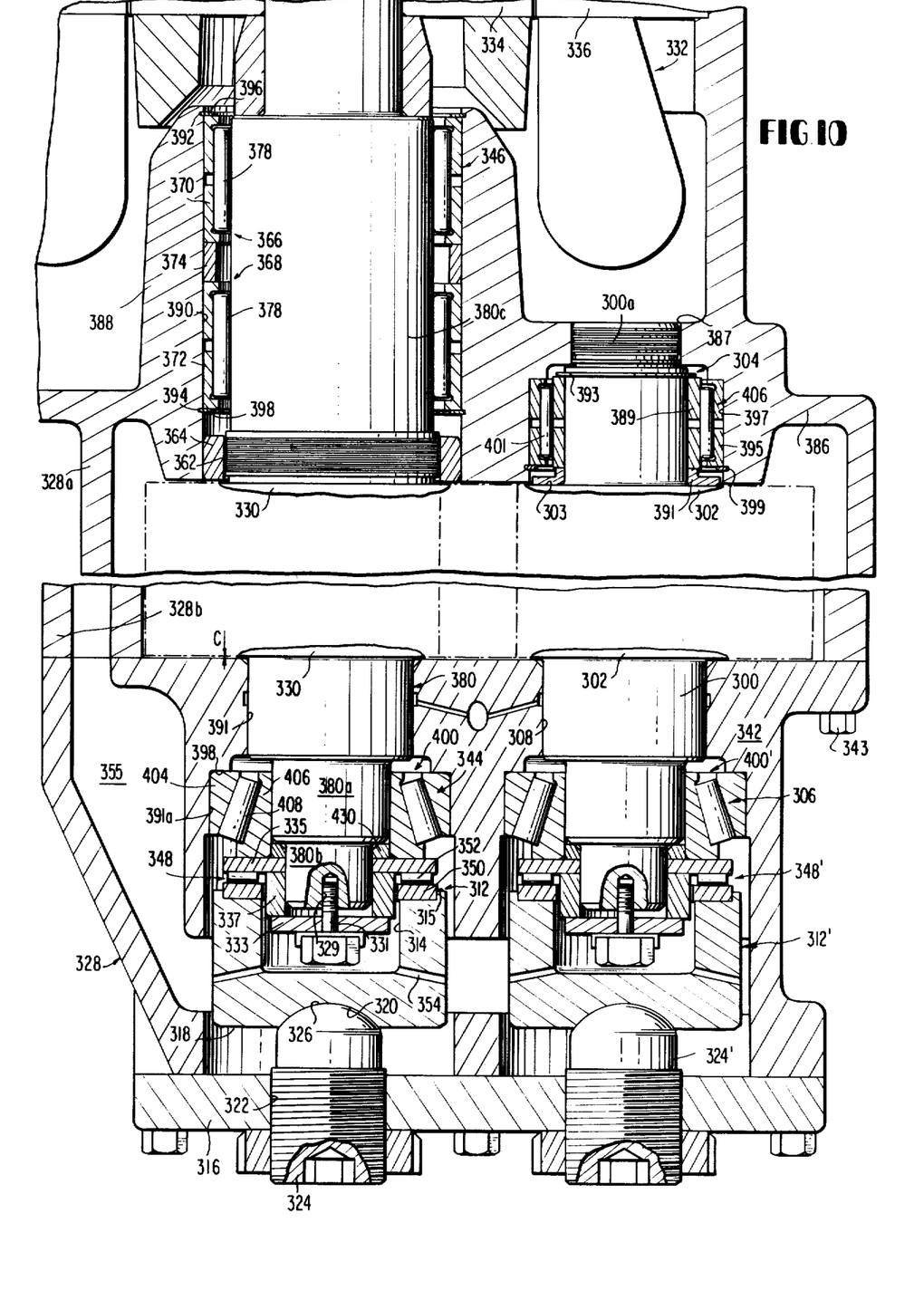
FIG. 10 is a vertical sectional view of a portion of another embodiment of the improved vertical, hermetic rotary helical screw compressor of the present invention showing a modified form of the upper and lower bearing pack assemblies.

Turning next to FIG. 10, a portion of an alternate embodiment of the invention is shown with the vertical sectional view illustrating both the female and male rotors and the shafts and bearing assemblies for the vertical, hermetic screw compressor unit. In the fragmentary view of the compressor and motor, portions of the hermetic unit which are internal of the outer enclosure (not shown) include an inner casing or housing indicated generally at 328 including an upper casing section 328a and a lower casing section 328b. These sections are of modified cylindrical shape, and the lower section 328b is closed off by means of a casing end plate 342 which is screwed thereto by means of screws 343. The motor indicated generally at 332 comprises a rotor 334 and a stator 336, with the rotor 334 being concentrically mounted internally of the stator 336 for rotation about its axis on a shaft indicated generally at 380 and bearing in addition to the motor rotor 334, the female rotor indicated generally at 330. In addition, a second shaft 300 acts to support the male rotor 302 in side-by-side fashion for rotation about an axis parallel to that of shaft 380 with the male and female rotors being of the helical screw variety and having their helical surfaces is mesh. This embodiment of the invention is characterized by the specific upper and lower bearing pack assemblies for the shafts 380 and 300 bearing respectively the female and male rotors. In that respect, shaft 380 is provided with an upper bearing pack assembly indicated generally at 346 and a lower bearing pack assembly indicated generally at 344. For shaft 300, there is provided an upper bearing pack assembly indicated generally at 304, and a lower bearing pack assembly indicated generally at 306. The lower bearing pack assembly 306 is identical to bearing pack assembly 344, while the upper bearing pack assemblies 304 and 346, having some common characteristics, but are not identical. With respect to shaft 380, this shaft includes on the discharge or outlet side of the female rotor 330, a reduced diameter portion 380a and terminates in a further reduced diameter portion 380b. Also, there is an enlarged diameter portion as at 380c which extends upwardly and away from the suction side of the female rotor 330. The lower casing section 328b is provided with the end plate 342 which is mounted thereto and bears a bore 391 for receiving shaft 380, shaft 300 being borne within bore 308 of that casing end plate 342.

With respect to the female rotor, the end plate 342 is counterbored at 391a forming a shoulder 398 against which the radially outer cup 404 of tapered roller bearing assembly 400 bears, the tapered roller bearing assembly 400 being completed by a radially inner annular cone 406 and a plurality of tapered rollers 408. Contrary to the embodiment particularly illustrated in FIGS. 7A-7D, instead of a second tapered roller bearing, a needle thrust bearing 348 is provided. In this regard, the casing section 328b which is closed off by lower roller bearing pack assembly end plate 316 supporting a cylinder or collar 312 which is centrally recessed as at 314 on its upper end face 315 and terminates and has its lower end face 318 provided with a spherical recess 320. The end plate 316 is tapped and threaded as at 322 and receives a hex headed, threaded plug 324 whose end face 326 is spherical conforming to the spherical recess 320 within the end face of cylinder 312. The recess 314 is somewhat larger than the diameter of shaft section 380b and receives the end of that shaft section. Further, the portion 380b carries needle bearing 348 for taking up a portion of the thrust load provided by the weight of the assembly of the shaft, female rotor and the motor rotor 334. In that respect, the shaft portion 380b is tapped and threaded at its center as at 329 and receives the threaded end of a screw 331 which bears against a circular retainer plate 333. The circular plate 333 is apertured as at the center to permit the screw 331 to pass therethrough and has an external diameter which is larger than the diameter of the shaft portion 380b but less than that of the circular recess 314 of collar 312. The bearing assembly is further made up of an annular ring 335 having an internal diameter slightly larger than the diameter of shaft portion 380b and an external diameter on the order of that of cone 406 with its upper surface abutting that cone. Further, shim 430 is provided, which in like manner to the embodiment of FIGS. 7A-7D, and acts the same as shim 130 in that embodiment, to provide a predetermined clearance C between the end face of the female rotor 330 and the end face or thrust surface of end plate 342. The assembly further comprises a sleeve or cylinder 337 which abuts plate 333 at one end and ring 335 at the opposite end, thereby permitting the tapered roller bearing 400 to be pressed axially on shaft section 380a and to effect the desired clearance C between the rotor 330 and the end plate 342. This portion of the assembly is in many respects similar to that of the embodiment of FIG. 9. However, a distinction may be made in that the annular ring 335 performs an additional function as it acts as one race for the second bearing constituting needle bearing 348, the other components comprising an annular ring 350 defining the lower race for the needle bearing and a plurality of non-tapered needle bearing rollers 352. The ring or lower race 350 has an internal diameter equal to the external diameter of sleeve 337 and an external diameter less than that of the collar 312. With end face 315 bearing the lower race or ring 350, it may be readily appreciated that by rotation of the threaded plug 324, the thrust needle bearing assembly may be preloaded to a degree determined by the torque applied to the hex headed threaded plug 324. The cylinder or annular collar 312 is provided with one or more holes 354 which open to a cavity 355 within casing 328 common to both roller bearing pack assemblies 400 and 400', the cavity 355 being open either to compressor suction or to a closed thread after suction cut-off. Due to the interfitting spherical fit between the end face 327 of plug 324 and the spherical recess 320 within the collar or cylinder 312, the collar 312 will tilt slightly to adapt itself to the proper position necessary to insure alignment of the needle bearing assembly to the shaft 380, thus defining a self-aligning bearing assembly. This is particularly important in two respects. The end plug 324 and collar 312 permits preloading and the absence of end play between the tapered roller bearing and the needle bearing. Otherwise, the gap C would have to be larger by a magnitude in order to prevent the rotors 330 and 302 from contacting the outlet end plate 342. Further, with respect to the straight needle thrust bearing 348, improper loading is possible due to misalignment of the bearing assembly. However, the tapered roller bearing indicated generally at 400 can take up to 2° of angular misalignment without problem.

With respect to the male rotor 302 and shaft 300, the lower bearing pack assembly is identically structured, in this case there being a tapered roller bearing 400' and a needle thrust bearing 348' with the needle bearing 348' being mounted by way of a second collar or cylinder 312' by way of a threaded end plug 324'. However, at the opposite end of the shafts, the upper bearing pack assemblies are somewhat different. With respect to the upper bearing pack assembly 346 for shaft 380, as mentioned previously, the shaft 380 employs an enlarged diameter shaft portion 380c which is machined throughout its axial length to provide surface portion functioning as bearing inner races. The upper casing section 328a is provided with a transverse wall 368 including a right angle cylindrical section 388 which projects axially to each side of the remaining portion of the transverse or end wall 386. This cylindrical section 388 is provided with a bore of given diameter and along its axial extent, it is provided with circular grooves 392 and 394 which carry snap rings 396 and 398 respectively. A portion of the shaft section 380c adjacent the suction or inlet end face 360 of the rotor 330 is serrated as at 362 and faces an annular sealing ring 364 which is fixedly pressed into and preferably is force fitted to the inner wall or bore 390 of cylindrical section 388 of the end wall. Further, the sealing ring 364 has an internal diameter which is slightly larger than the diameter of the shaft section 380c at the serrations 362 so as to form with those serrations a labyrinth seal. The upper bearing pack assembly 346 is characterized by an upper needle 366 and a lower needle bearing 368. In this respect, the shaft portion 380 forms the radially inner races for the needle bearings, while separate outer races are employed as at 370 and 372 respectively for bearings 366 and 368. An annular spacer or ring 374 of a given axial length is interposed between the outer race members 370 and 372 and the snap rings 396 and 398 lock the races and the spacer in axial position with the races supporting therebetween, the uniform diameter needle bearing rollers 378 for each of the bearings 366 and 368. The roller bearings 366 and 368 may comprise HJM-445628 matched heavy duty roller bearings and the needle thrust bearings 348, 348' may comprise FA-49937 TRD-2840 bearings for the lower bearing assemblies 344 and 306. Since the housing or casing 328 may be formed of aluminum, the aluminum cylinder section 388 may be easily machined to provide for bore 390 and ring grooves 392. The bearing pack assembly components may be axially pressed into the bore 390 of cylindrical section 388 and maintained axially by way of the snap rings 396 and 398.

Turning to the upper bearing pack assembly 304 for shaft 300, a single needle bearing 406 is employed. The end transverse wall 386 is bored at 387 and receives the serrated end 300a of shaft 300 which is of slightly less diameter than that of bore 387 to define with bore 387 a highly effective labyrinth seal at this point. Inwardly of shaft portion 300a in the direction of the male rotor 302, there is located a radially inner race member as at 389, this cylindrical race member 389 abutting at one end a spacer 391, which abuts the end face 303 of male rotor 302, the cylindrical inner race member 389 being maintained in position by way of a snap ring 393 fixed to the shaft 300 via a slot and bearing against the opposite end of that member. An outer race member 395 is mounted within a counterbore 397 within the end wall 386 and is maintained in position by a second snap ring 399.

A plurality of non-tapered needle bearing rollers 401 are interposed between the radially inner and outer races 389 and 395 forming the radially loaded needle bearing 406 for the upper end of shaft 300. It should be remembered that in this embodiment the upper bearing pack assemblies do not bear any thrust loads, but simply take up radial loading of the shafts at that end of the machine.

With respect to the invention as disclosed in all embodiments, the operation of the compressor is believed to be readily understood by the previous description. It should be remembered that since the discharge or outlet end of the compressor is vertically downward and the generated thrust is in the opposite direction, the weight of the componentry tends to balance out this generated thrust along with the application of discharge gas pressure on the upper end of the shaft commonly supporting the motor rotor and the female screw rotor, for the rotor and on the upper end of the shaft supporting male rotor (not shown).

What is claimed is:

1. A vertical axis hermetic rotary helical screw compressor comprising:

a closed vertical, cylindrical outer enclosure, an inner cylindrical casing of a diameter less than that of the outer enclosure, means for concentrically, fixedly mounting said inner cylindrical casing within said outer enclosure, said inner cylindrical casing including transverse wall means separating said cylindrical casing into upper and lower chambers, rotor means including intermeshed helical screw rotors, vertical shaft means for at least one of said helical screw rotors and coaxially fixed to said at least one helical screw rotor intermediate of the ends of said vertical shaft means, a casing end plate fixed to the lower end of said inner cylindrical casing, a vertical bore means formed within said casing for mounting said at least one helical screw rotor and partially forming therewith a compressor working chamber, an upper roller bearing pack assembly carried by said casing means at said transverse wall means for supporting the upper end of said vertical shaft means, and a lower roller bearing pack assembly carried by said casing end plate for supporting the lower end of said vertical shaft means, said lower roller bearing pack assembly including at least one tapered roller bearing for absorbing compressor developed thrust force, an inlet tube opening to said casing bore means and said compressor chamber at the upper end of said at least one helical screw rotor for supplying working fluid to said compressor, an electrical drive motor, said motor including a stator and a rotor, said motor rotor being coaxially mounted to the upper end of said vertical shaft means above said upper roller bearing pack assembly, said stator being fixedly mounted to said inner casing, concentrically about said motor rotor and spaced radially therefrom, said end plate underlying the lower end face of said at least one helical screw rotor and including a horizontal compressor discharge passage for receiving the compressed working fluid, said casing further comprising a vertical compressor discharge passage means extending from said casing end plate to said transverse wall means and opening to the upper chamber housing said drive motor at one end and said horizontal compressor discharge passage at the other end, an axial gas discharge outlet within the top of said vertical cylindrical outer enclosure, the upper end face of said at least one helical screw rotor being open to the upper roller bearing pack assembly, seal means carried by said upper roller bearing pack assembly for sealing said upper chamber from said at least one helical screw rotor upper end face, said seal means including a rotatable seal element fixed to said shaft means and rotatable therewith, and passage means carried by said electric drive motor for permitting said compressed working fluid to pass into said cylindrical outer enclosure at the upper end of said motor, such that during compressor operation, compressor discharge pressure acting on the upper end of said shaft means and on said at least one rotatable seal element and the weight of said motor rotor and said screw rotor partially balances the developed thrust forces acting on said at least one helical screw rotor, while said upper and lower roller bearing pack assemblies absorb the remaining developed thrust force and any radial force acting on said shaft means.

2. The vertical axis hermetic rotary helical screw compressor as claimed in claim 1, wherein said upper roller bearing pack assembly comprises an upper tapered roller bearing pack assembly including axially spaced tapered roller bearings, and said seal means is mounted within said upper roller bearing pack assembly, intermediate of said tapered roller bearings.

3. The vertical axis hermetic rotary helical screw compressor as claimed in claim 1, wherein said seal means comprises a labyrinth seal including a stationary labyrinth seal ring fixedly mounted within said casing transverse wall means and a radially aligned annular labyrinth member carried by said shaft means, said labyrinth seal member having an outer diameter slightly less than the inner diameter of said labyrinth seal ring, and wherein said labyrinth seal member is provided with a serrated face facing the opposing surface of said labyrinth seal ring and spaced slightly therefrom.

4. The vertical axis hermetic rotary helical screw compressor as claimed in claim 2, wherein said seal means comprises a labyrinth seal including a stationary labyrinth seal ring fixedly mounted within said casing transverse wall means and a radially aligned annular labyrinth seal spacer press fitted to said shaft means, said labyrinth seal spacer having an outer diameter slightly less than the inner diameter of said labyrinth seal ring, and wherein said labyrinth seal spacer is provided with a serrated face facing the opposing surface of said labyrinth seal ring and spaced slightly therefrom.

5. The vertical axis hermetic rotary helical screw compressor as claimed in claim 2, wherein said transverse wall means comprises an integral vertical cylindrical portion, said upper tapered roller bearing pack assembly comprises an outer sleeve, said sleeve being fixedly, concentrically mounted within said transverse wall cylindrical portion and said seal means comprises a face seal including an L-shaped seal ring having a base portion fixed to the inner wall of said sleeve and having a radial leg portion projecting towards said rotating shaft means, said shaft means carries a spring retaining ring fixedly mounted thereto and extending radially outwardly therefrom towards said sleeve and terminating short of said base portion of said seal ring and being spaced axially from said radial leg portion and to the side of said base portion opposite the leg portion, a face seal element positioned axially between said spring retaining ring and said fixed seal ring and including a radially inwardly directed base and a radially outwardly directed leg portion including an axial projection, said axial projection contacting one side of said leg portion of said face seal ring, and a wavy spring interposed between said spring retaining ring and said face seal element, on the side opposite said axial projection, and being compressed therebetween for pressing the axial projection on said seal element against the opposed face of said fixed seal ring.

6. The vertical axis hermetic rotary helical screw compressor as claimed in claim 5, further comprising an annular seal spacer fixed to said shaft and rotatable therewith, said spacer being of rectangular longitudinal and having a radially outer face in contact with the base of said face seal element, and an O-ring carried by said spacer, on said radially outer face and bearing on the base of said face seal element for sealing the upper end of said upper tapered bearing pack assembly from the inlet end face of said at least one helical screw rotor.

7. The vertical axis hermetic rotary helical screw compressor as claimed in claim 2, wherein said transverse wall means comprises a vertical cylindrical portion through which one end of said shaft means for said at least one helical screw rotor projects, and said upper tapered roller bearing pack assembly comprises an outer sleeve force fitted within said transverse wall cylindrical portion, upper and lower double row tapered roller bearings, said seal means comprises a working fluid bearing seal interposed axially within said sleeve intermediate of said upper and lower double row tapered roller bearings, said sleeve including three axially spaced sets of circumferentially spaced, drilled holes, an outer annular bearing race member for each of said double rows of tapered roller bearings and an outer annular seal ring for said bearing seal, pins mounted within said holes for respective sets and being fixed respectively to said double row tapered roller bearings outer race member and to said seal ring for axially fixing these elements to said sleeve, said outer races, each of said outer race members including oppositely directed oblique roller contact surfaces at respective ends and facing said shaft means, a plurality of annular bearing cones force fitted to said shaft means facing said opposed tapered surfaces of said radially outer bearing race members, annular spacers interposed between said cones including an annular seal spacer interposed between respective upper and lower double row tapered roller bearings and concentric with said outer seal ring and defining therebetween a working fluid seal for preventing the compressor discharge from returning to the upper end face of said at least one helical screw rotor, and a rotor end face spacer mounted to said shaft and interposed between the upper end face of said at least one rotor and the lowermost annular cone, sets of circumferentially spaced, tapered rollers interposed between respective cones and the oblique surfaces of said bearing outer race members and clamping means carried by said shaft means for axially compressing the elements of said upper bearing pack assembly against said face spacer.

8. The vertical axis hermetic rotary helical screw compressor as claimed in claim 7, wherein said seal ring comprises an annular metal ring of rectangular longitudinal section and having a flat radially inner face facing the seal spacer ring and being interposed between the uppermost cone of said lower double row tapered roller bearing and the lowermost cone of said upper double row tapered roller bearing, and the radially outer surface of said seal spacer being serrated and having a diameter slightly smaller than the radially inner diameter of said fixed seal ring to define a low pressure loss labyrinth seal intermediate of said upper and lower double row tapered roller bearings.

9. The vertical axis hermetic rotary helical screw compressor as claimed in claim 1, wherein said lower roller bearing pack assembly comprises a lower tapered roller bearing pack assembly having two oppositely drected tapered roller bearings, the lower end of said shaft means projecting below said at least one helical screw rotor comprises first and second reduced diameter portions defining radial shoulders therebetween, said casing end plate including a small diameter opening on the upper side facing said at least one helical screw rotor for receiving the lower end of said shaft and an enlarged diameter opening portion on its lower side as an axial extension thereof, the upper bearing comprises a first angular cup carried within said enlarged diameter opening of said casing end plate with the upper end of said cup abutting a radial shoulder formed within said casing end plate intermediate of said small and large diameter openings, said upper bearing further including an annular cone press fitted to said first reduced diameter portion of said shaft means and said second bearing comprises a second annular cone of a smaller diameter than that of said first cone and having a radially outer face which is oblique and faces axially downwardly, said hermetic rotary helical screw compressor further comprises a lower bearing pack assembly end plate including a bearing cup retainer of cylindrical form fixed thereto and extending axially upwardly thereof, within said large diameter opening of said end plate and having its inner periphery stepped to define a bearing cup retainer shoulder, and said lower bearing comprises an annular cup facing said second cone and having its lower end abutting the shoulder of said annular cup retainer, a first annular shim mounted to said second reduced diameter portion of said shaft means and between the upper end face of said second cone and said shaft means second shoulder, said first shim having a thickness determined by the distance between the lower end of said first cone and said second shoulder on said shaft means when said at least one rotor lower end face abuts the opposing surface of said casing end plate and a predetermined minimal clearance dimension between said lower end face of said at least one rotor and the opposing surface of said casing end plate when said second cone is axially locked in abutment with said first cone, means for axially locking said second cone in axial abutment with said first cone and said first shim, and a second shim interposed between said lower bearing pack assembly end plate and said casing end plate and having a thickness conforming to the desired clearance between the lower end face of said at least one helical screw rotor and said casing end plate when said first cup is pressed against the shoulder of said casing end plate and means for fixedly mounting said lower bearing pack assembly end palte against the outer wall of said casing end plate with said second shim interposed therebetween; whereby, regardless of whether the compressor is under compressive load or not, said minimal clearance is maintained at the lower end face of said at least one helical screw rotor for minimizing loss of compressed working fluid back to the inlet side of the compressor.

10. The vertical axis hermetic rotary helical screw compressor as claimed in claim 7, wherein said lower roller bearing pack assembly comprises a lower tapered roller bearing pack assembly having two oppositely directed tapered roller bearings, the lower end of said shaft means projecting below said at least one helical screw rotor comprises first and second reduced diameter portions defining radial shoulders therebetween, said casing end plate including a small diameter opening on the upper side facing said at least one helical screw rotor for receiving the lower end of said shaft and an enlarged diameter opening portion on its lower side as an axial extension thereof, the upper bearing comprises a first annular cup carried within said enlarged diameter opening of said casing end plate with the upper end of said cup abutting a radial shoulder formed within said casing end plate intermediate of said small and large diameter openings, said upper bearing further including an annular cone press fitted to said first reduced diameter portion of said shaft means and said second bearing comprises a second annular cone of a smaller diameter than that of said first cone and having a radially outer face which is oblique and faces axially downwardly, said hermetic rotary helical screw compressor further comprises a lower bearing pack assembly end plate including a bearing cup retainer of cylindrical form fixed thereto and extending axially upwardly thereof, within said large diameter opening of said end plate and having its inner periphery stepped to define a bearing cup retainer shoulder, and said lower bearing comprises an annular cup facing said second cone and having its lower end abutting the shoulder of said annular cup retainer, a first annular shim mounted to said second reduced diameter portion of said shaft means and between the upper end face of said second cone and said shaft means second shoulder, said first shim having a thickness determined by the distance between the lower end of said first cone and said second shoulder on said shaft means when said at least one rotor lower end face abuts the opposing surface of said casing end plate and a predetermined minimal clearance dimension between said lower end face of said at least one rotor and the opposing surface of said casing end plate when said second cone is axially locked in abutment with said first cone, means for axially locking said second cone in axial abutment with said first cone and said first shim, and a second shim interposed between said lower bearing pack assembly end plate and the casing end plate and having a thickness conforming to the desired clearance between the lower end face of said at least one helical screw rotor and said casing end plate when said first cup is pressed against the shoulder of said casing end plate and means for fixedly mounting said lower bearing pack assembly end plate against the outer wall of said casing end plate with said second shim interposed therebetween; whereby, regardless of whether the compressor is under compressive load or not, said minimal clearance is maintained at the lower end face of said at least one helical screw rotor for minimizing loss of compressed working fluid back to the inlet side of the compressor.

11. The vertical axis hermetic rotary helical screw compressor as claimed in claim 8, wherein said lower roller bearing pack assembly comprises a lower tapered roller bearing pack assembly having two oppositely directed tapered roller bearings, the lower end of said shaft means projecting below said at least one helical screw rotor comprises first and second reduced diameter portions definine radial shoulders therebetween, said casing end plate including a small diameter opening on the upper side facing said at least one helical screw rotor for receiving the lower end of said shaft and an enlarged diameter opening portion on its lower side as an axial extension thereof, the upper bearing comprises a first annular cup carried within said enlarged diameter opening of said end plate with the upper end of said cup abutting a radial shoulder formed within said casing end plate intermediate of said small and large diameter openings, said upper bearing further including an annular cone press fitted to said first reduced diameter portion of said shaft means and said second bearing comprises a second annular cone of a smaller diameter than that of said first cone and having a radially outer face which is oblique and faces axially downwardly, said hermetic rotary helical screw compressor further comprises a lower bearing pack assembly end plate including a bearing cup retainer of cylindrical form fixed thereto and extending axially upwardly thereof, within said large diameter opening of said end plate and having its inner periphery stepped to define a bearing cup retainer shoulder, and said lower bearing comprises an annular cup facing said second cone and having its lower end abutting the shoulder of said annular cup retainer, a first annular shim mounted to said second reduced diameter portion of said shaft means and between the upper end face of said second cone and said shaft means second shoulder, said first shim having a thickness determined by the distance between the lower end of said first cone and said second shoulder on said shaft means when said at least one rotor lower end face abuts the opposing surface of said casing end plate and a predetermined minimal clearance dimension between said lower end face of said at least one rotor and the opposing surface of said casing end plate when said second cone ix axially locked in abutment with said first cone, means for axially locking said second cone in axial abutment with said first cone and said first shim, and a second shim interposed between said lower bearing pack assembly end plate and the casing end plate and having a thickness conforming to the desired clearance between the lower end face of said at least one helical screw rotor and said casing end plate when said first cup is pressed against the shoulder of said casing end plate and means for fixedly mounting said lower bearing pack assembly end plate against the outer wall of said casing end plate with said second shim interposed therebetween; whereby, regardless of whether the compressor is under compressive load or not, said minimal clearance is maintained at the lower end face of said at least one helical screw rotor for minimizing loss of compressed working fluid back to the inlet side of the compressor.

12. The vertical axis hermetic rotary helical screw compressor as claimed in claim 1, wherein the bottom of said closed vertical cylindrical outer enclosure constitutes an oil sump containing oil and said compressor further comprises conduit means for fluid communicating the interior of said lower roller bearing pack assembly with said oil within said outer enclosure oil sump, and wherein the oil within said sump being at discharge pressure tends to move within the compressor towards the suction side of the compressor, allowing oil to be entrained within the compressor discharge gas and wherein the discharge gas passing upwardly through said passage means within said casing and into said upper chamber permits entrained oil to migrate, because of the pressure differential through said upper roller bearing pack assembly towards the upper end face of said at least one helical screw rotor which is at compressor suction pressure, and wherein said discharge gas in passing through said motor rotor cools said motor and by centrifugal force due to rotation of said motor rotor separates the entrained oil from the discharge working fluid at the upper end of said enclosure, and said compressor further comprises a circular plate deflector mounted to the upper end of said enclosure and immediately overlying the motor rotor and stator and being interposed between the motor rotor and the axial outlet such that oil moving with the discharge gas impacts during rotation of the motor rotor against the deflector plate to cause some oil to cling to the lower surface of said plate and to separate from the discharge working fluid, said gas free of oil escaping about the deflector plate perphery and seeking the axial discharge outlet.

13. The vertical axis hermetic rotary helical screw compressor as claimed in claim 12, wherein said inlet tube includes a filter element for filtering the compressor working fluid intake and wherein a bleed line connects said conduit means to the compressor inlet tube upstream of said filter means to the inlet tube upstream of said filter for bleeding a portion of said oil to effect filtering of the oil along with the inlet working fluid passing to the compressor screw rotor bore means of said casing.

14. The vertical axis hermetic rotary helical screw compressor as claimed in claim 13, further comprising a solenoid operated valve within said bleed line for selectively controlling the flow of oil bled from said conduit means.

15. The vertical axis hermetic rotary helical screw compressor as claimed in claim 1, wherein said lower roller bearing pack assembly comprises a single tapered roller bearing, the lower end of said shaft means projecting below said at least one helical screw rotor comprises first and second reduced diameter portions defining from said rotor first and second radial shoulders therebetween, said casing end plate including a small diameter opening at the upper side facing said at least one helical screw rotor for receiving the lower end of said shaft and being provided with an enlarged diameter opening portion at its lower side as an axial extension of said small diameter opening, said single tapered roller bearing comprising a first annular cup carried within said enlarged diameter opening of said casing end plate with the upper end of said cup abutting a radial shoulder formed within said casing end plate at the juncture of said small and large diameter openings, said lower bearing pack assembly further including an annular cone press fitted to said first reduced diameter portion of said shaft means, an annular shim having a thickness determined by the distance between the lower end of said cone and the second shoulder on said shaft means when said at least one rotor lower end face abuts the opposing surface of said casing end plate and a predetermined minimal clearance dimension between said lower end face of said at least one rotor and the opposing surface of said casing end plate with the upper end of said cup abutting the shoulder within said casing end plate, a retainer plate in common abutment with said shim and the lower end of said cone and spanning said shaft means, and means for threadably, axially locking said cup retainer plate against said cone and said shim and fixed to the end of said shaft means; whereby, regardless of whether said compressor is under compressive load or not, said minimal clearance is maintained at the lower end face of said at least one helical screw rotor for minimizing loss of compressed working fluid back to the inlet side of the compressor.

16. The vertical axis hermetic rotary helical screw compressor as claimed in claim 1, wherein said lower roller bearing pack assembly comprises a tapered roller bearing and a thrust needle bearing, the lower end of said shaft means projecting below said at least one helical screw rotor comprises first and second reduced diameter portions defining from said rotor outwardly, first and second radial shoulders therebetween, said casing end plate including a first relatively small diameter opening on the upper side facing said at least one helical screw rotor for receiving the lower end of said shaft means and being provided with an enlarged diameter opening portion on its lower side as an axial extension thereof, said tapered roller bearing comprising a first annular cup carried within said enlarged diameter opening of said casing end plate, with the upper end of said cup abutting a radial shoulder formed within said casing end plate at the intersection of said small and large diameter openings, said tapered roller bearing further including an annular cone press fitted to said first reduced diameter portion of said shaft means, and a circumferential array of tapered rollers positioned between said annular cup and said annular cone, an annular shim mounted to said second reduced diameter portion of said shaft means and between the upper end face of said cone and said shaft means second shoulder, said shim having a thickness determined by the distance between the lower end of said cone and said second shoulder on said shaft means when said at least one rotor lower end face abuts the opposing surface of said casing end plate plus a predetermined minimal clearance dimension between said lower end face of said at least one rotor and the opposing surface of said casing end plate when said cup is axially locked in abutment with said casing end plate shoulder, said thrust needle bearing comprising a first upper annular ring concentrically surrounding said second reduced diameter portion of said shaft means and abutting the lower face of said cone and said shim and defining an upper race for said needle bearing, a second ring underlying said first ring and forming a second race for said needle bearing, a circumferential horizontal array of needle bearing rollers positioned intermediate of said rings about said second reduced diameter portion of said shaft means, an annular collar of a diameter in excess of said second reduced diameter portion of said shaft means and having a circular recess within its upper face receiving the projecting lower end of said shaft means second reduced diameter portion and having an axial end face bearing on the second ring and positioned between said shaft means and said lower bearing pack assembly end plate, an end plug threadably mounted to said lower bearing pack assembly end plate and bearing on the lower end face of said annular collar, said lower end face of said collar bearing a spherical recess at the center thereof and said end plug terminating in a spherical end face conforming to that of said recess and being received therein such that said end plug and said collar define an orthogonal self-aligning means for said thrust needle bearing.

17. The vertical axis hermetic rotary helical screw compressor as claimed in claim 1, wherein the transverse wall means comprising a vertical cylindrical portion through which one end of said shaft means for said at least one helical screw rotor projects, said shaft means comprises a portion on the suction side of said helical screw rotor having a serrated surface over an axial extent thereof, said wall means having an internal diameter in excess of that of the projecting portion of said shaft means, a portion of said projecting shaft means comprises the inner race for at least one needle roller bearing and said upper roller bearing pack assembly further comprises at least one outer race member carried by said vertical cylindrical portion, snap rings carried by said vertical cylindrical portion on the inner surface thereof and locking said at least one race member axially, and a plurality of needle bearing rollers constituting a vertical axis circumferential array positioned between said portion of said shaft means and said at least one outer race member and a fixed annular seal ring mounted within said vertical cylindrical portion concentric to said serrated shaft portion and spaced slightly therefrom and defining with said serrated shaft portion a labyrinth seal for restricting the flow of discharge gas through said upper roller bearing pack assembly and towards the compressor inlet.

18. The vertical axis hermetic rotary helical screw compressor as claimed in claim 17, wherein said at least one needle roller bearing comprises two in number and being mounted within said vertical cylindrical portion of said transverse wall means axially on the side of said labyrinth seal remote from said at least one helical screw rotor.

19. The vertical axis hermetic rotary helical screw compressor as claimed in claim 17, wherein said at least one needle roller bearing comprises a single needle roller bearing mounted to said shaft immediately adjacent said at least one helical screw rotor, and said labyrinth seal means is located to the side of said single needle roller bearing remote from the end face of said at least one helical screw rotor.

20. The vertical axis hermetic rotary helical screw compressor as claimed in claim 1, further comprising; an oil strainer, a small diameter tube operatively coupled to the oil downstream of said oil strainer and projecting through said compressor inlet tube and terminating at its opposite end at an oil injection port opening to said compressor bore at a helical screw closed thread position adjacent the inlet side of the compressor chamber formed thereby, such that relatively cool, highly viscous oil is injected into the compressor to seal the threads with minimum adverse effect upon compressor capacity.

21. The vertical axis hermetic rotary helical screw compressor as claimed in claim 20, further comprising an oil sump and wherein said small diameter oil tube includes an integral coil portion within said compressor inlet tube to substantially reduce the temperature of the oil emanating from said sump and directed by said small diameter tube to said oil injection port.

* * * * *